UNITED STATES PATENT OFFICE.

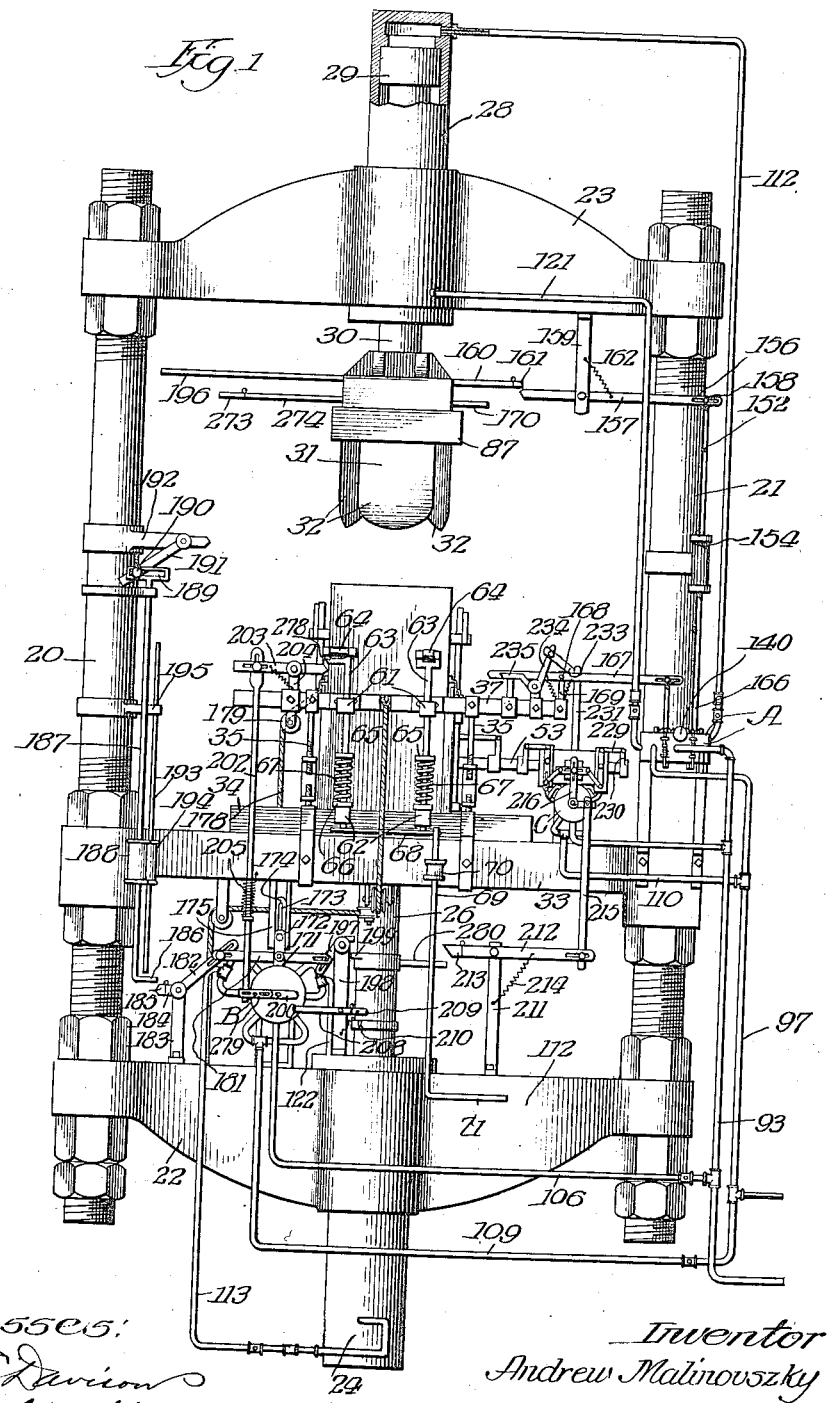

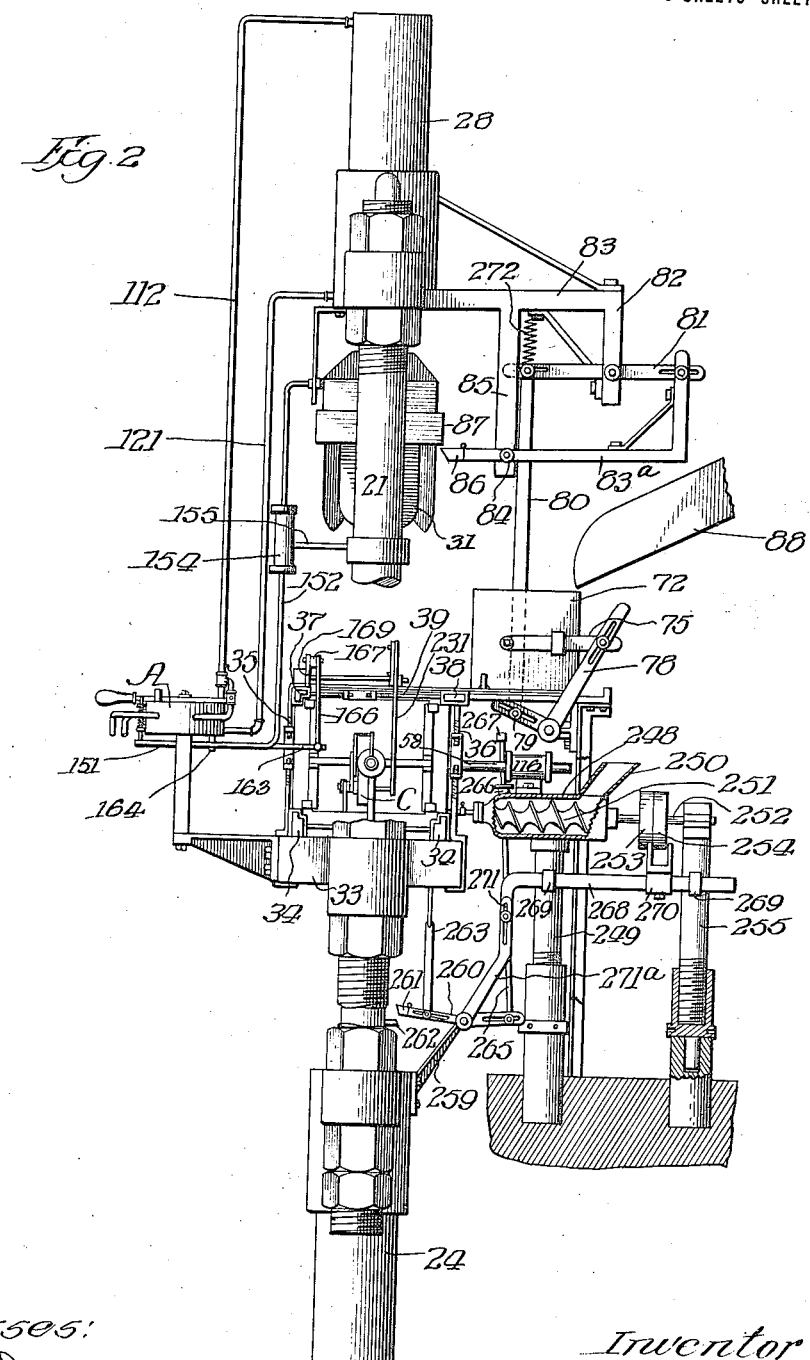

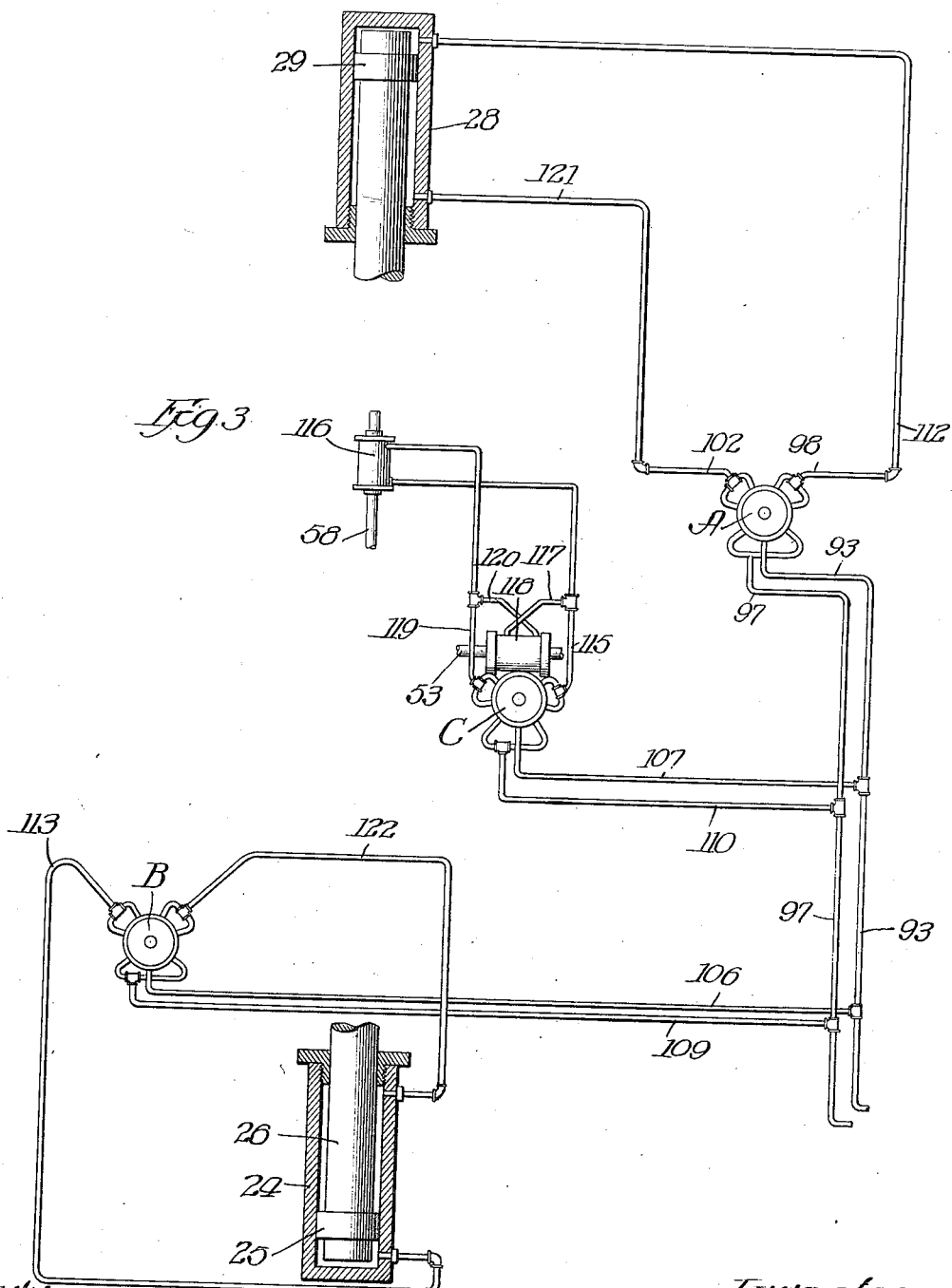

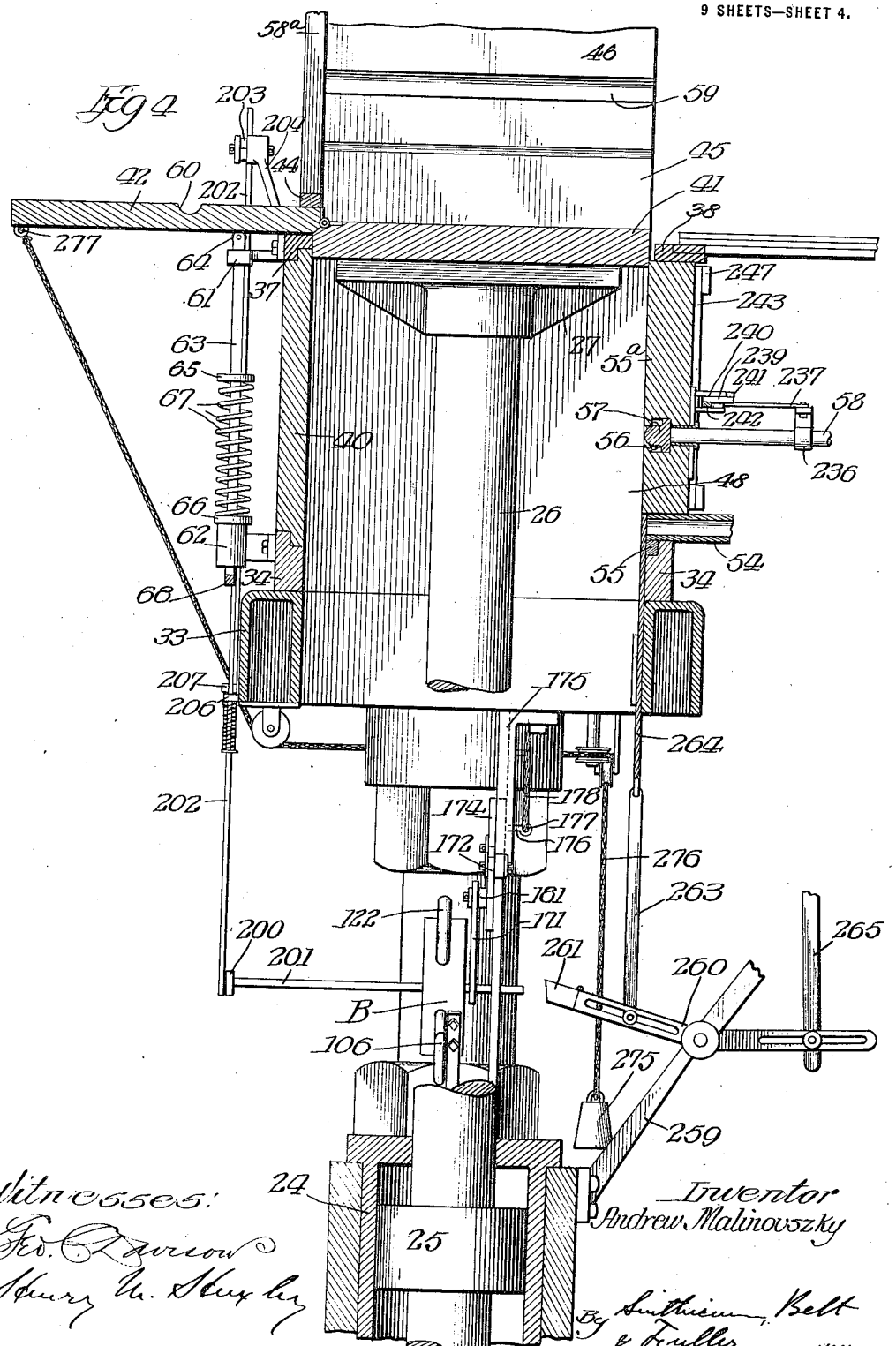

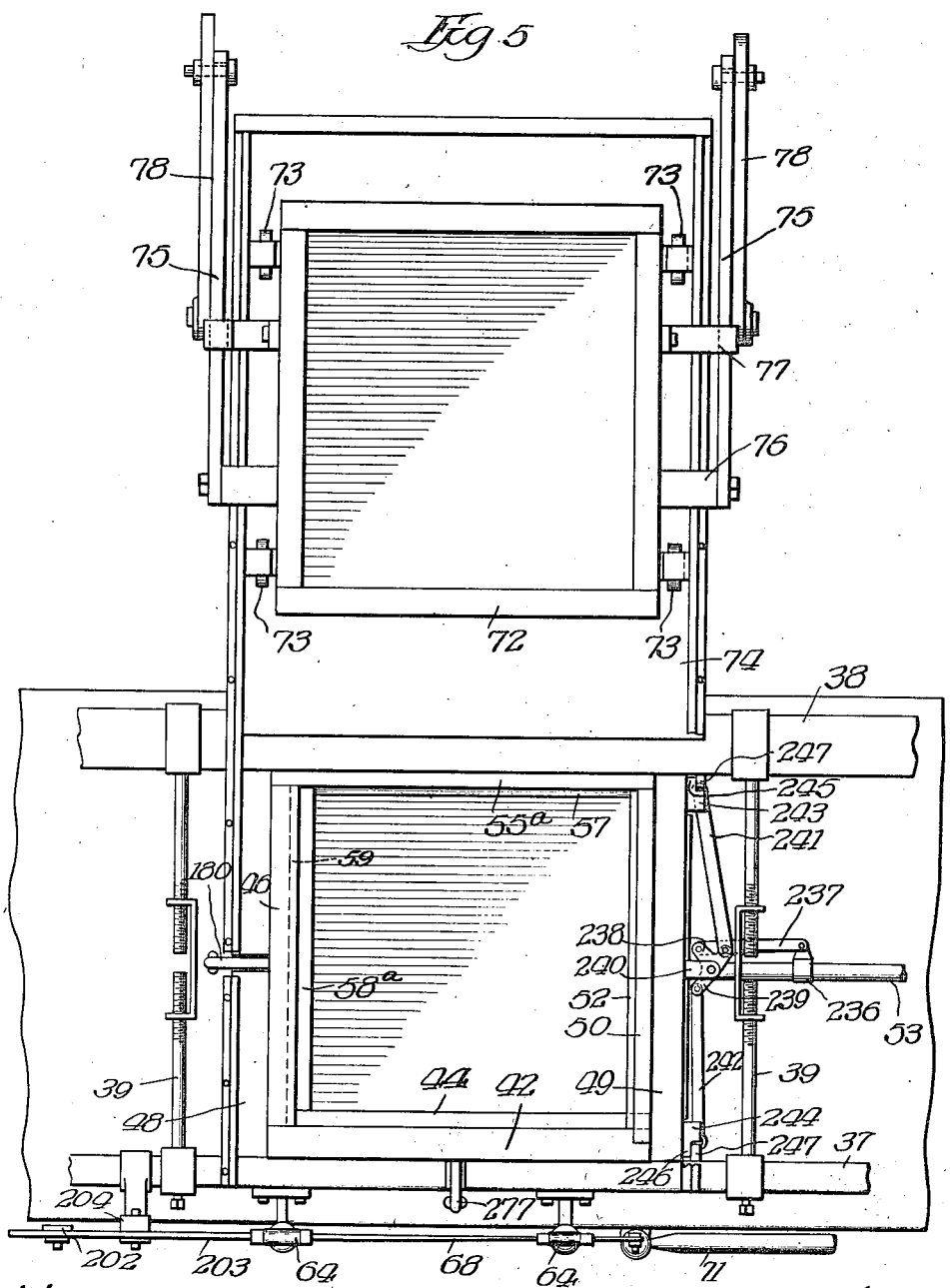

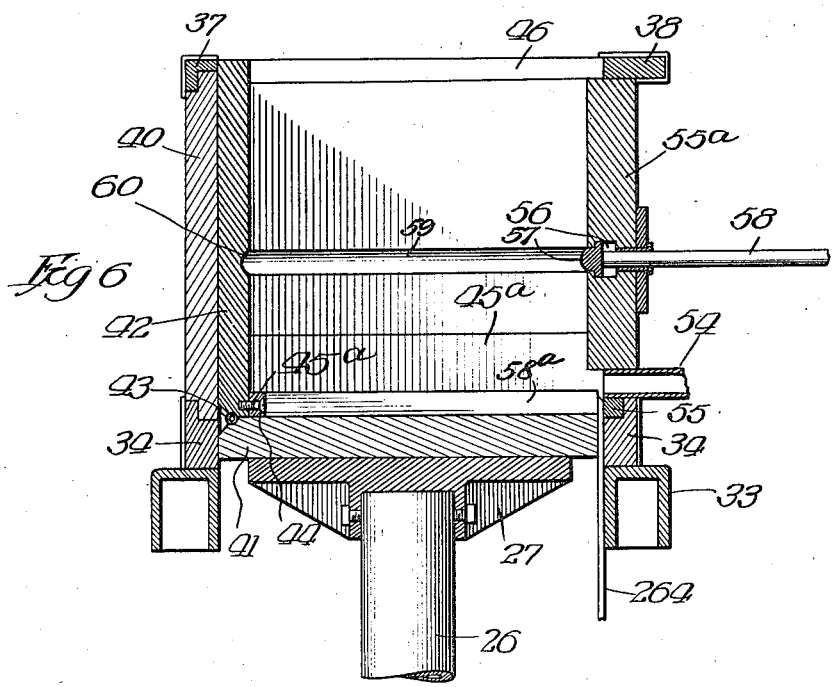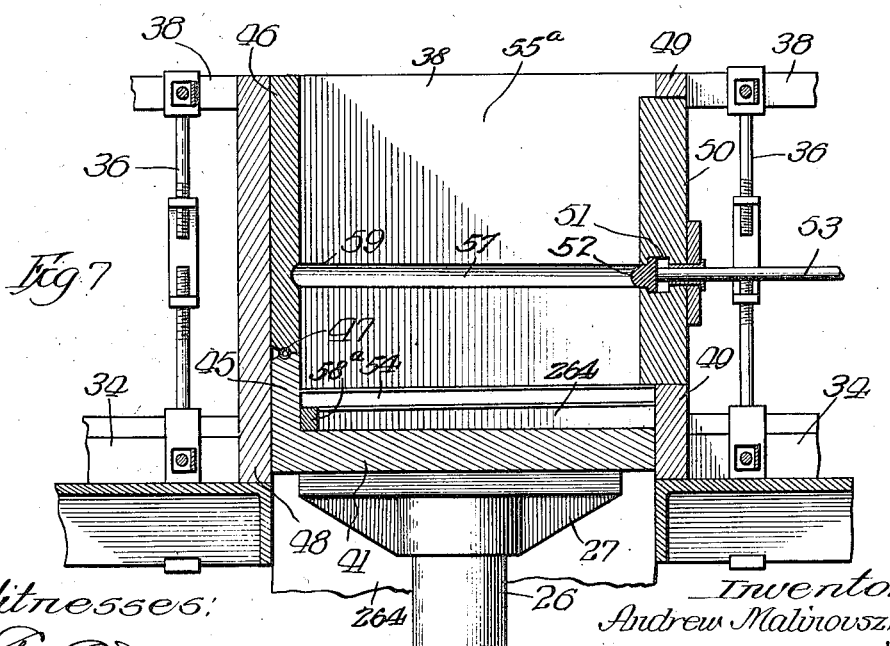

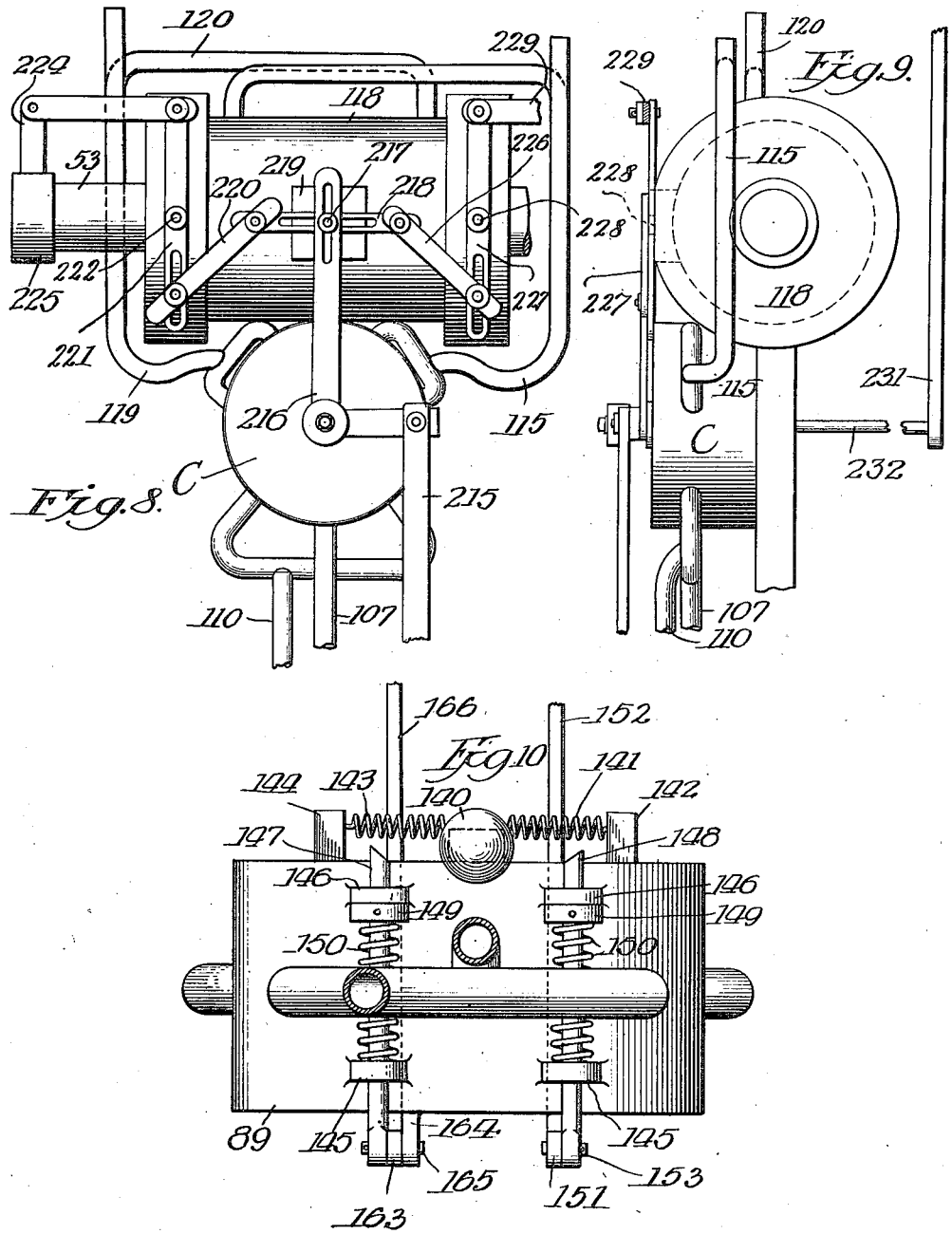

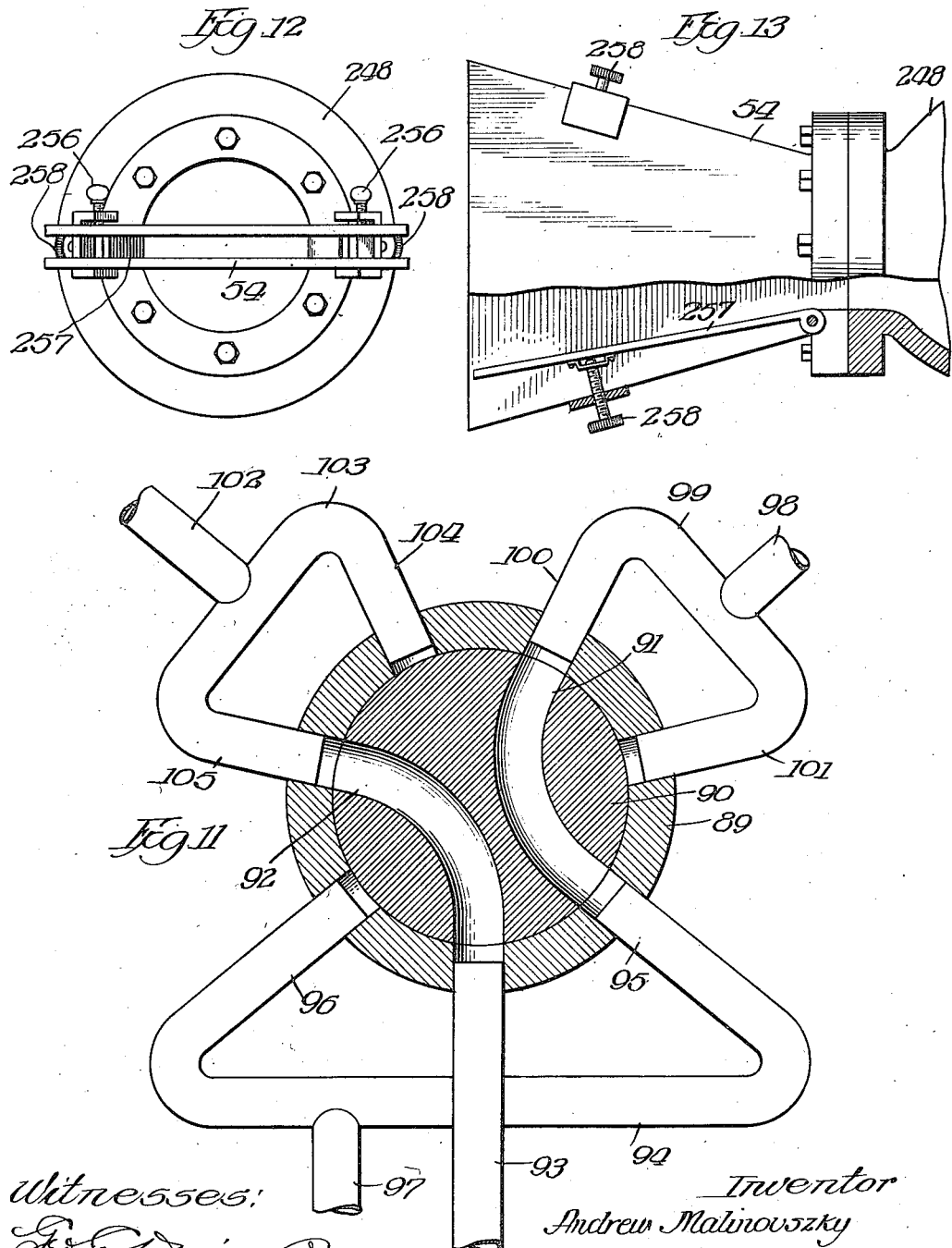

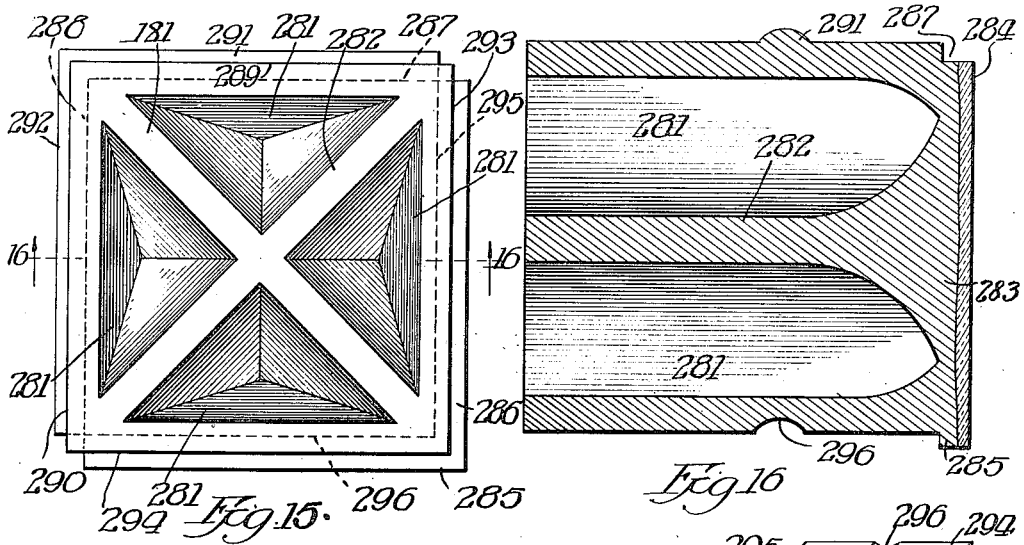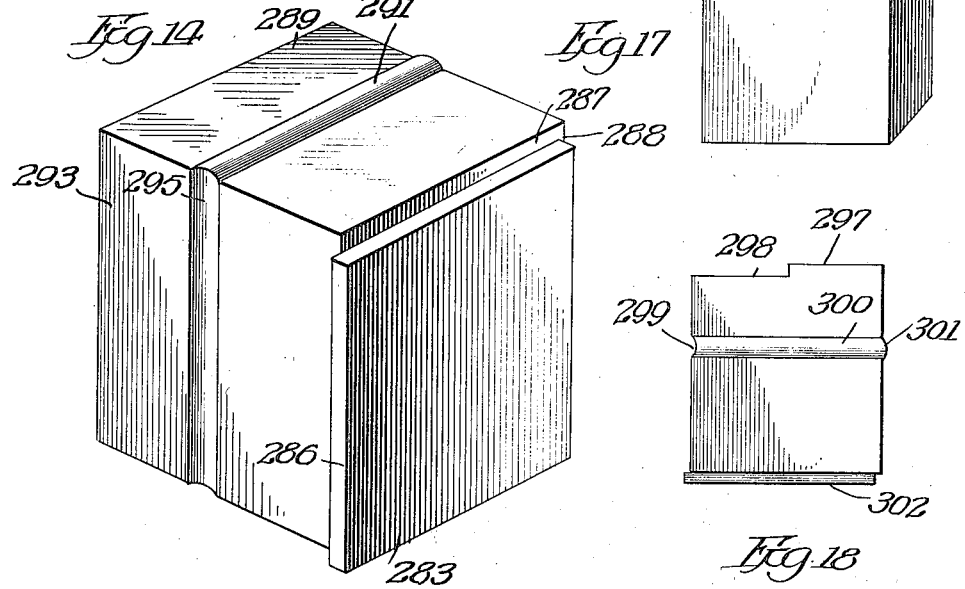

ANDREW MALINOVSZKY, OF CHICAGO, ILLINOIS, ASSIGNOR TO HARRY H. RANDOLPH, OF CHICAGO, ILLINOIS.

MOLDING-MACHINE.

1,210,664.  Specification of Letters Patent.  Patented Jan. 2, 1917.

Application filed October 5, 1912. Serial No. 724,009.

*To all whom it may concern:*

Be it known that I, ANDREW MALINOVSZKY, a citizen of the United States, residing at Chicago, in the county of Cook and State of Illinois, have invented certain new and useful Improvements in Molding-Machines, of which the following is a specification.

My invention relates to molding machines, and refers particularly to machines for molding bricks, terra cotta articles, and the like.

It is one of the objects of my invention to provide a machine which will be largely automatic in its operation whereby the cost of manufacture of bricks and other similar articles may be materially reduced.

It is a further object of my invention to so construct the molding machine that it is rapid in operation, so that the production of bricks may be largely increased.

A still further object resides in the use of suitable automatic mechanism so that the material of which the bricks or other articles are molded is subjected to a uniform pressure, thereby giving the finished article a uniform texture.

These and other advantages of my invention will be more readily understood by reference to the accompanying drawings, which show a preferred embodiment of my invention, and in which—

Figure 1 is a front elevation of my improved molding machine; Fig. 2 is a side elevation of the machine shown in Fig. 1; Fig. 3 is a diagrammatic front elevation of the various valves used in connection with my machine and the pipes extending between said valves; Fig. 4 is an enlarged vertical section through the central part of my molding machine, showing particularly the mechanism operated in connection with the plunger and the mold box; Fig. 5 is a fragmentary plan, showing the mold box and feeding mechanism therefor; Fig. 6 is a fragmentary vertical section through the mold box and plunger operating in connection therewith; Fig. 7 is a vertical section similar to Fig. 6 but taken at a right angle thereto; Fig. 8 is a front elevation of one of the valves used in my invention and the cylinder operated by the fluid controlled by said valve; Fig. 9 is a side elevation of the parts shown in Fig. 8; Fig. 10 is a front elevation of the main control valve which I employ; Fig. 11 is a horizontal section through the valve shown in Fig. 10, the piping used in connection with this valve also being shown; Fig. 12 is an end elevation of the enamel feeding mechanism; Fig. 13 is a plan of the parts shown in Fig. 12, a portion being broken away to show the interior construction of the device; Fig. 14 is a perspective of one of the building blocks produced by the use of my machine; Fig. 15 is a rear elevation of the block shown in Fig. 14; Fig. 16 is a sectional view taken on the line 16—16 of Fig. 15; Fig. 17 is a perspective of a second form of block which may be made in my machine; and Fig. 18 is a side elevation of a third form of block.

Extending between the side posts 20 and 21 are the lower casting 22 and the upper casting 23. The cylinder 24 passes through and is supported by the casting 22. Operating within this cylinder is the piston 25, to which is attached the piston rod 26 having at its upper end the mold support 27. The cylinder 28 is supported by the upper casting 23. The piston 29 operates within the cylinder 28, and is provided with the piston rod 30, which has on its lower end the molding plunger 31. In connection with the machine which I am describing I have shown the molding plunger 31 as consisting of a plurality of molding members 32, but it will be understood that this plunger could be made of any desired shape, in accordance with the shape of the bricks or other material which are to be produced.

I will next describe the detailed construction of the mold box, in which the bricks, or other objects, are molded into the desired form. At approximately the central portion of the machine the platform 33 extends between the supporting posts 20 and 21. As best shown in Fig. 4, this platform 33 is provided with an aperture through which the mold support 27 may freely pass. The frame members 34 are supported on the platform 33. The adjustable connecting members 35 and 36 (best shown in Fig. 2) extend from the platform 33 to the angle iron 37 and the rod 38, respectively, and the adjustable connecting members 39 serve to connect the angle iron 37 with the rod 38. The front housing board 40 is held in position between the frame member 34 and the angle iron 37. As most clearly shown in Figs. 6 and 7, the bottom 41 of the mold box rests on and is attached to the mold support 27. The front edge of the mold bottom 41 is beveled at its corner and is attached to the front 42 of the mold box by means of the hinge 43. The front portion of the lower edge of the front member 42 is also beveled, so that the front member may swing into a horizontal position, as shown in Fig. 4, under the conditions which will hereafter be described. The strip 44 is attached to the lower portion of the front member 42 by means of the screws 45$^a$, in order to mold one special shape of brick which it is contemplated should be manufactured by this machine.

As best shown in Fig. 7, the bottom member 41 is provided with an upward extension 45 on one side, and to the edge of this extension the side mold member 46 is attached by means of the hinge 47. The outer portions of the meeting edges of the extension 45 and the member 46 are cut away in order that the side member 46 may be free to swing in an outward direction. The side housing member 48 extends from the platform 33 to the rod 38 and the angle iron 37, which are clamped by means of the connecting members 39 to securely hold these housing members and the stationary members of the mold box, which will presently be described, in position. The stationary side member 49 of the mold box is provided with a bodily movable portion 50, which has therein the recess 51, within which the ridge member 52 attached to the piston rod 53 is adapted to operate. Supported on the frame member 34 is the end of the enamel delivery spout 54, the strip 55 being used to fill the space between the angular shaped frame member 34 and the spout 54. The rear mold member 55$^a$ extends between the spout 54 and the rod 38, and is provided with a recess 56, within which the ridge member 57 attached to the piston 58 is adapted to operate. It will now be apparent that the front mold member 42 and the side member 46 will be raised when the piston rod 26 is raised, while the rear mold member 55$^a$ and the side mold member 49 with its movable portion 50 will remain in stationary positions, the movement of the members 50 and 55$^a$ being entirely in a lateral direction. In order to make the special shape of brick which I have in mind, I employ a strtip 58$^a$ attached to the strip 44 and lying in the angle formed between the bottom 41 and its extension 45, when the mold box is in closed position, so that a corresponding recess will be formed in the edge of the finished brick. In the side member 46 and the front member 42 I use the recesses 59 and 60 respectively, in order to form corresponding ridges on the brick. The movable members 50 and 55$^a$ are employed to form extensions along the lower edges of the brick, but if it is desired to make a brick with a plain side and rear face, it is, of course, unnecessary to use such movable members, and stationary members may be substituted for the movable members which I have described. The guides 61 are attached to the angle iron 37, and guides 62 are attached to the front frame member 34. Extending through each of the guide members 61 and its corresponding guide member 62 is a rod 63 having a roller 64 mounted at its upper end. A collar 65 is attached to each of the rods 63, and between this collar and the washer 66 supported on the guide member 62 is a compression spring 67. The rod 68 connects the lower ends of the rods 63, and engages the rod 69 passing through the guide 70. The rod 69 is bent at its lower portion into the form of a treadle 71 on which the operator may step, for the purpose to be described hereafter.

I will next describe the feeding mechanism for the mold: The feeding box 72 is provided with rollers 73 adapted to be moved over the platform 74. The box 72 is bottomless. A rod 75 is attached to each side of the feeding box 72 by means of the brackets 76 and 77. A bell crank lever 78 has slotted connection with each rod 75, and the two bell crank levers 78 have slotted connection with a rod 79 which is pivotally connected to the link 80. The upper end of this link 80 has slotted connection with the end of a lever 81 pivotally attached to the arm 82 of the frame 83. The opposite end of the lever 81 has slotted connection with a bell crank lever 83$^a$, which is pivoted at 84 to the arm 85 of the frame 83$^a$. Hinged to the end of the bell crank lever 83 is the movable member 86, which, as clearly shown in Fig. 2, may be freely moved in an upward direction but may not be moved in a downward direction without actuating the bell crank lever 83$^a$. The movable member 86 of the bell crank lever is adapted to be engaged by the collar 87 located just above the molding plunger 31. Clay or other suitable material of which the bricks are to be formed is supplied to the feeding box 72 through the chute 88.

I will next describe the system of valves and pipes used for the actuation of my machine: The construction of each of the valves which I employ is diagrammatically represented in Fig. 11, although the controlling mechanism for the various valves is of several types. The valve consists of a circular casing 89, within which the disk 90 may be rotated. This disk is provided with the passages 91 and 92. An inlet pipe 93 is attached to the casing 89. The outlet pipe 94 is suitably bent so that its two ends 95 and 96 pass through the casing 89. Connected to the outlet pipe 94 is the pipe 97. Attached to the pipe 98 is the pipe 99, having the branches 100 and 101 which enter the casing 89. Similarly, the pipe 102 has a pipe 103 attached thereto, the latter being provided with the branch pipes 104 and 105 which enter the valve casing 89. It will now be clear that when the valve disk 90 is in the position shown in Fig. 11 water or other fluid will enter through the pipe 93, then pass through the passage 92 of the valve disk, next through branch pipe 105 into the pipe 103, and thence through the pipe 102. At the same time fluid may pass through the pipe 98 into pipe 99, thence through the branch 100, and next through the passage 91, through the branch pipe 95 into the pipe 94, and thence through the outlet pipe 97. If the valve disk 90 is now rotated in a clockwise direction so that one end of passage 92 is brought opposite the pipe 96, at the same time the opposite end of passage 92 is brought into register with the branch pipe 104. One end of passage 91 is also brought into register with the inlet pipe 93, and the opposite end of passage 91 is brought into register with branch pipe 101. The fluid in pipe 93 will now flow through passage 91 into branch pipe 101, thence into pipe 99, and next into pipe 98. Meanwhile, fluid passing through pipe 102 will pass into pipe 103 and its branch pipe 104, thence through passage 92 into pipes 96 and 94, and finally through outlet pipe 97.

I have described the detailed construction of the valves shown in Fig. 11 as applied particularly to the main control valve A and the pipes which are connected with said valve. The lower cylinder valve B, and the mold valve C, are of the same type as the main control valve A, and operate according to the same principle; but the pipe connections for the two valves last mentioned are somewhat different, and, in the description which follows, the pipes used in connection with said valves will be given different reference numerals from the pipes used in connection with valve A. The inlet pipe 93 previously mentioned is connected with any suitable source of high pressure fluid, although I prefer water as the fluid with which to operate my machine. As best shown in Fig. 3, a pipe 106 extends to valve B, and the pipe 107 extends to valve C. The outlet pipe 97 from valve A connects with any suitable waste pipe or receptacle for storing the water used in my machine. The outlet pipe 109 extends from valve B to pipe 97, and, similarly, outlet pipe 110 extends from valve C to pipe 97. Pipe 98 extends from valve A to pipe 112, which connects with cylinder 28 at the upper portion thereof. Pipe 113 extends from valve B to the lower portion of the cylinder 24. Pipe 115 extends from valve C to one end of cylinder 116, the branch pipe 117 extending from pipe 115 to one end of cylinder 118. Pipe 119 extends from valve C to the opposite end of cylinder 116 from that with which the pipe 115 is connected, and pipe 120 leads from pipe 119 to the opposite end of the cylinder 118 from that with which the branch pipe 117 is connected. Pipes 121 and 102 connect the lower end of cylinder 28 with the valve A. Pipe 122 connects valve B with the upper end of cylinder 24.

I will now pass to a description of the mechanism for operating the main control valve A. This valve may be set and locked in a desired position, and by the action of suitable mechanism the valve is unlocked and automatically returns to neutral position when the plunger of the molding machine reaches a predetermined position on its up and down strokes. Attached to the valve disk 90 is the handle 140, which has attached to opposite sides thereof a spring 141 fastened to the post 142 and a spring 143 attached to the post 144, these posts being located on the stationary part of the valve casing. Made integral with the valve casing 89 are a pair of guides 145 and a pair of guides 146. Through one of the lower guides 145 and one of the upper guides 146 passes the locking rod 147, and through the second lower guide 145 and the second upper guide 146 passes the locking rod 148. A collar 149 is mounted on each of the locking rods 147 and 148, each of these collars normally engaging the guide 146 on account of the action of the spring 150 which engages on one end the guide 145 and on the opposite end the collar 149. The locking rod 147 has a beveled end so disposed that when the handle 140 is moved to the left from the position shown in Fig. 10 the locking rod is depressed, and then moves up into locking position by the action of the spring 150 after the handle has passed the rod 147. Similarly, the end of locking rod 148 is beveled, so that the locking rod is depressed, and then moves up into locking position as the handle 140 is moved to the right. The forwardly extending end 151 of the rod 152 is attached by means of the pin 153 to the lower end of the locking rod 148. The rod 152, as best shown in Fig. 2, passes through the guide 154 held by the bracket 155 attached to the post 21. The upper end of rod 152 engages the slot 156 in the lever 157 by means of the pin 158. The lever 157 (see Fig. 1) is pivotally attached to the bracket 159. The rod 160 having the hinged end 161 is attached to the upper portion of the molding plunger 31. As the plunger moves down the portion 161 of the rod 160 is free to move up, but after the rod 160 is in a horizontal plane lower than that of the lever 157, if the molding plunger is moved up the portion 161 of the rod 160 engages the end of the lever 157, so that the left-hand portion of the latter is moved upwardly, thereby moving the right-hand portion downwardly. A spring 162 between the right-hand portion of the lever 157 and the bracket 159 serves to normally hold the right-hand portion of the lever 157 in an upward position, thereby coöperating with the spring 150 to hold the collar 149 in engagement with the guide 146. A lever 163 has slotted engagement at its end with the lower end of the locking rod 147. The lever 163 is pivotally connected with the bracket 164 by the pin 165. As best shown in Fig. 2, the rear end of lever 163 is pivotally connected with the link 166, which, in turn, is connected with the end of the lever 167 pivotally mounted at 168 on the bracket 169 carried by the angle iron 37. The rod 170 mounted on the molding plunger 31 is adapted to engage the left-hand end of the lever 167 (according to the representation of Fig. 1), thereby causing the left-hand end of this lever to be depressed and the right-hand end to be raised. This causes the link 166 to be raised, thereby raising the rear end of lever 163, and depressing the front end of this lever. The latter operation causes the locking rod 147 to be depressed.

I will now describe the mechanism for operating valve B, which controls the actuation of the piston rod 26. Attached to the disk 90 of this valve is a rod 171, (see Fig. 1) to which is pivotally attached the link 172, which, in turn, engages the slot 173 of the slide 174, which operates within the guide 175. A rod 176 (see Fig. 4) having in its end the eye 177 is attached to the slide 174, and passes through a suitable slot in the guide 175. A rope or cable 178 is attached to the eye 177 of the rod 176, and after passing over the sheave 179 is attached to the eye bolt 180 fastened to the side member 46 (see Fig. 5). A lever 181 is pivotally attached to the upper end of the arm 171, and has slotted engagement at one end with the bell crank lever 182 carried by the bracket 183. The short arm 184 of the bell crank lever 182 has a hinged movable portion 185 adapted to be engaged by the bent end 186 of the rod 187, which passes through the guide 188. At the upper end of the rod 187 is contained the slot 189 engaged by the pin 190 on the bell crank lever 191 carried by the bracket 192. The guide 188 contains a spring which normally moves the rod 187 upwardly into the position shown in Fig. 1. A rod 193 carried by the guides 194 and 195 and normally held in the position shown in Fig. 1 by a spring within the guide 194 is adapted to engage the bent end 186 of the rod 187 when the said rod 193 is depressed by having its upper end engaged by the rod 196 carried by the molding plunger 31. The right-hand end of the lever 181, shown in Fig. 1, has slotted engagement with a bell crank lever 197 carried by the bracket 198. This bell crank lever is adapted to be engaged by the arm 199 carried by the piston rod 26 when the latter is moved upwardly from the position shown in Fig. 1. The lever 200 is carried on the end of the rod 201 (see Fig. 4) which is rigidly connected with the valve disk 90, and has slotted connection with the lever 279, which at its opposite end has slotted connection with the rod 202, as shown in Fig. 1. At its upper end the rod 202 has slotted engagement with the lever 203 pivotally mounted on the bracket 204. A lateral extension on one of the rods 63 engages the right-hand end of the lever 203 as the rods 63 are moved downwardly, and again as the latter pass upwardly into their normal position, shown in Fig. 1. The extension spring 205 connects the rod 202 with the supporting frame 33, and normally tends to move the rod 202 upwardly until the stop 206 on the rod 202 engages the guide 207 on the supporting frame 33, as best shown in Fig. 4. Carried on the bracket 198 is the lever 208 having the hinged end 209 adapted to be engaged by the rod 210 carried by the piston rod 26.

I will next describe the mechanism which actuates the valve C and the mechanism which is controlled by said valve for the purpose of performing various functions in connection with the operation of the mold box. The bracket 211 is attached to the lower casting 22. The lever 212 having the hinged end portion 213 is pivotally attached to the bracket 211, and the right-hand part of this lever is normally moved downwardly, as indicated in Fig. 1, by the spring 214. The link 215 is pivotally connected at one end with the slot in the end of the lever 212, and at its opposite end has pivotal connection with the bell crank lever 216, which is connected with the disk 90 of the valve C. As most clearly shown in Fig. 8, the slotted upper end of the bell crank lever 216 is connected by the pin 217 with the slotted bar 218, which is adapted to move back and forth in the guide 219. The link 220 is pivotally attached to one end of the bar 218, and at its opposite end this link is connected with the slotted end of the lever 221 pivoted at 222. The upper end of the lever 221 is pivotally connected with the rod 223 which has its opposite end attached to the bracket 224 attached to the collar 225 on the piston rod 53. To the right-hand end of the bar 218 (as shown in Fig. 8) is pivotally attached the link 226, the opposite end of which is connected with the slotted end of the lever 227 pivoted to the cylinder 118 at 228. To the upper end of the lever 227 is pivotally attached the link 229 having its opposite end attached to the bracket 230 carried by a collar on the piston rod 53, as best shown in Fig. 1.

As most clearly shown in Fig. 9, a lever 231 is rigidly attached to the rod 232 connected with the axis of the disk 90 of the valve C. As shown in Fig. 1, the link 233 is pivotally attached to the upper end of the lever 231, the opposite end of this link being pivotally attached to the upper end of the bell crank lever 234 pivotally mounted on a bracket attached to the angle iron 37. The end of the arm 235 of the bell crank lever 234 is adapted to be engaged by the rod 160 when the molding plunger 31 is carried down. As clearly shown in Fig. 3, the piping from the valve C is such that the piston rod 58 within the cylinder 116 is operated simultaneously with the piston rod 53 within the cylinder 118.

As most clearly shown in Figs. 4 and 5, each of the pistons 53 and 58 carries a collar 236, which, in turn, has pivotally connected thereto a link 237. This link is pivotally connected at its opposite end with an arm 238 on the toggle 239, which is pivotally connected with the bracket 240 on the movable portions of the side and rear mold members. The rods 241 and 242 are connected to the opposite ends of the toggle 239. The outer end of the rod 241 is pivotally connected with the locking strip 243 and the outer end of the rod 242 is similarly connected with the locking strip 244. The locking strips 243 and 244 are provided with locking extensions 245 and 246, respectively, which are slipped behind the coöperating strips 247 when the movable portion 50 of the side member 49 and the movable portion 55ª of the rear mold member are in the positions shown in Figs. 5 and 7, thereby holding such movable portions securely in position. When the piston rods 53 and 58 are moved outwardly, the ridge members 52 and 57 are correspondingly moved until they strike the bottom of the recesses 51 and 56. The toggle 239 is turned at the same time so that the locking strips 243 and 244 are withdrawn from engagement with the coöperating locking members 247. The movable members 50 and 55ª are then free to move as a whole until they engage the members 247. On the other hand, when the piston rods 53 and 58 are moved inwardly, the movable members 50 and 55ª are first carried into the positions shown in Figs. 6 and 7, and then the ridge members 52 and 57 are carried still farther inwardly to the position shown in Fig. 7, while at the same time the toggle 239 is moved into the position shown in Fig. 5, thereby carrying the locking projections 245 and 246 back of the coöperating locking members 247.

I will next describe the mechanism for feeding enamel or other similar material to the mold box. A cylinder 248 is carried by a suitable support 249, the hopper 250 being attached to one end of this cylinder. Within the cylinder is the conveyer screw 251 driven by the shaft 252 having mounted thereon the tight and loose pulleys 253 and 254, respectively. The rear end of the shaft 252 is carried by a suitable bearing on the support 255. As most clearly shown in Figs. 12 and 13, the cylinder 248 has attached thereto the flattened delivery spout 54, the upper and lower portions of which may be adjusted toward or away from each other by means of the screws 256. The guides 257 are controlled by the screws 258, and serve to adjust the width of the stream of material delivered to the bottom of the mold box.

As best shown in Fig. 6, the end of the delivery spout 54 enters the mold box at approximately the level of the bottom of the latter when the bottom 41 of the mold box is in its lowermost position. As best shown in Fig. 2, the bracket 259 is attached to the lower cylinder 24. Pivotally connected with the bracket 259 is the lever 260 having on its front end the hinged movable member 261. When the piston rod 26 moves upwardly, the arm 262 of this piston engages the movable member 261, and turns it upwardly without moving the lever 260; but when the piston rod 26 moves downwardly, the arm 262 engages the movable member 261, and causes the lever 260 to be operated.

As indicated in Figs. 2 and 4, the rod 263 has slotted connection with the left-hand portion of the lever 260. To the upper end of rod 263 is attached the slide 264, the upper end of which is adapted to cover the end of the delivery spout 54, and thereby interrupt delivery of enamel or other similar material contained within the cylinder 248 to the mold box. The rod 265 has slotted connection with the right-hand end of the lever 260, as indicated in Figs. 2 and 4, and then passes upwardly through the guide 266 attached to the cylinder 248, and carries on its upper end the rod 267 adapted to engage the bell crank levers 78. The bent bar 268 has its end connected with the slot 271 in the arm 271ª integral with the lever 260, and at its upper portion rests on the hook-like supports 269. The bar 268 carries the belt shifter 270 adapted to move a belt from the tight pulley 253 to the loose pulley 254, and vice versa.

Having thus described the various parts used in my invention, the operation of my improved molding machine may now be readily understood: Let us assume that the piston 29 is in its uppermost position and the piston 25 in its lowermost position. If it is desired to manufacture a brick with an enamel face, the belt which engages the pulley 253 or 254 is first shifted onto the tight pulley 253 by manually shifting the bar 268, thereby depressing the front end of the lever 260 and opening the slide 264. After the proper amount of enamel has been deposited on the bottom 41 of the mold box, the handle 140 of the valve A is moved to the left from the position indicated in Fig. 1 until it is held in locked position by the locking rod 147. The connections within the valve A are such that water or other fluid now flows from the supply pipe 93 into the pipe 98, and thence through the pipe 112 to the upper end of the cylinder 28, thereby exerting pressure to move the piston 29 down. Meanwhile water escapes through the pipes 121 and 102, and then passes through the valve A into the outlet pipe 97. The upper plunger in passing downwardly first causes the collar 87 to engage the end 86 of the lever 83$^a$. This causes the rod 80 to be depressed, and actuates the bell crank levers 78 so that the feed box 72 is moved toward the front of the machine until the feed box delivers its measured charge of clay or other similar material to the mold box. Any suitable measuring device may be used in connection with the chute 88, but such device does not come within the scope of my invention. As the feed box moves forward, the bell crank levers 78 engage the rod 267 and depress the rod 265, thereby raising the front end of the lever 260 and closing the slide 264. At the same time the bar 268 is moved to the right by the arm 271$^a$ so that the belt is moved from the tight pulley 253 to the loose pulley 254, thereby stopping further rotation of the shaft 252, which actuates the screw conveyer 251. After the feed box 72 has delivered its charge and the collar 87 has cleared the member 86, the spring 272 between the frame 83 and the lever 81 causes the front end of said lever to be lifted, and thereby moves the feed box back to its original position in a manner which will be readily understood. The piston rod continues to move down until the rod 196 engages the end of rod 193, while at the same time rod 170 engages the end of lever 167. By this time the molding plates 32 have passed into the mold box and subjected the clay within the mold box to a preliminary forming and pressing operation. As the piston rod 30 now continues to move downwardly, the rod 193 is depressed and engages the hook end 186 of the rod 187 until the end 186 engages the portion 185 of the bell crank lever 182. The latter is thereby actuated and pulls the bar 181 to the left, thereby correspondingly moving the arm 171 in a contra-clockwise direction, and carries with it the lower end of the link 172, thereby drawing down the slide 174 in the guide 175. This causes fluid to pass from the inlet pipe 106 through the valve B into the pipe 113, and from thence into the lower part of the cylinder 24. The piston 25 is thereby forced upwardly and fluid escapes from the cylinder through the pipe 122 and the valve B into the pipe 109, and thence into the outlet pipe 97. At the same time that this movement of the valve B takes place the engagement of the lever 167 by the rod 170 causes the right-hand end of this lever (as shown in Fig. 1) to be moved upwardly, thereby correspondingly moving the rod 166 up and depressing the front end of the lever 163 which is attached to the locking rod 147. When this locking rod is depressed the handle 140 of the valve A flies back into its neutral position by the action of the springs 141 and 143, and the passages in the valve disk 90 are brought opposite the blank spaces in the valve casing 89, so that the flow of fluid through the valve is prevented. By this action further downward travel of the piston rod 30 is stopped.

I have just described the piston 25 with its attached piston rod 26 as moving up. This action continues until the arm 199 strikes the end of the bell crank lever 197. This moves the bar 181 to the right into the position shown in Fig. 1. The valve B is thereby brought to neutral position, and the further upward movement of the piston rod 26 is stopped. This operation takes place after the piston rod 26 has moved a comparatively small distance, as, for example, one to two inches, in the machines of usual construction. When the special form of building blocks herein illustrated are to be made, this preliminary movement of the lower piston rod 26 is just enough to bring the upper edges of the strips 44 and 58$^a$ to the horizontal plane of the lower edges of the movable members 50 and 55$^a$. It will be evident that in this way the brick is first compressed from the top and then from the bottom, thereby causing an equal density throughout the brick and completely expelling air from the clay. I next turn the handle 140 of the valve A to the right until this handle is locked in position by the locking rod 148. This causes water to flow from the pipe 93 through the valve A into the pipe 102, and thence through the pipe 121 to the lower part of the cylinder 28, and causes the piston rod 30 to move up. Fluid is meanwhile expelled from the upper part of the cylinder 28 through the pipe 112, and then through pipe 98 and the valve A into the outlet pipe 97. When the piston rod 30 is in its lowermost position the member 161 of the rod 160 has passed the end of the bell crank arm 235, so that when the piston rod 30 begins to move up this arm of the bell crank lever, shown in Fig. 1, is correspondingly moved up, thereby causing the lever 231 to be moved to the right so that the valve C is opened and fluid passes from the pipe 107 through the valve C, through the pipes 115 and 117 to the cylinders 116 and 118, thereby causing the piston rods 53 and 130

58 to be actuated in a direction away from the mold box. This causes the ridge members 52 and 57 to be drawn into the recesses 51 and 56, respectively. The toggles 239 are then actuated, withdrawing the locking strips 243 and 244 and the sections 50 and 55ª are then moved outwardly.

As best shown in Fig. 8, as the piston rod 53 moves out the link 223 causes actuation of the lever 221, thereby moving the link 220 to the left so that the bar 218 is also moved to the left within its guide 219. At the same time the link 229 acting on the lever 227 causes a coöperating action on the link 226. When the bar 218 has moved a sufficient distance to the left, the right-hand end of the slot in said bar engages the pin 217 and moves the arm 216, thereby closing the valve and stopping further actuation of the piston rod 53. The piston rod 30 continues to travel upwardly until the hinge member 273 of the rod 274 engages the end of the bell crank lever 191. After the valve B has been closed immediately following its first opening the rods 187 and 193 have resumed the position shown in Fig. 1 on account of the springs within the guides 188 and 194. As the member 273 engages the bell crank lever 191 the rod 187 is again depressed and engages the member 185 of the bell crank lever 182, so that the valve B is again opened and fluid is admitted to the lower end of the cylinder 24, in a manner previously described, so that the piston rod 26 again moves up. As this operation takes place the front member 42 and the side member 46, together with the bottom member 41 of the mold box, are carried up until the front member 42 of the mold box clears the angle iron 37. As the side member 46 moves up, the cable 178 is also carried up and moves the slide 174. When the mold box reaches the position just described in which the front member 42 has cleared the angle iron 37, the slide 174 has drawn the link 172 and the arm 171 into a straight line so that the valve B is closed, and further upward travel of the piston rod 26 is prevented. Just before the front member 42 clears the angle iron 37, the side member 46 swings outwardly on the hinge 47, so that the recess 59 clears the corresponding ridge in the brick. On account of the action of the weight 275 carried by the cable 276 which passes over suitable sheaves and is attached to the eye 277 on the upper part of the front section 42, this front section is now swung forward with its attached strips 44 and 58ª and engages the rollers 64 carried by the rods 63. When this happens the rods 63 are depressed against the tension of the springs 67, causing the rods 68 and 69 to be simultaneously depressed. The operator now steps on the treadle 71 and removes the brick from the front member 42, which, on account of the weight of the operator, is prevented from immediately flying back into position. After the operator steps off of the treadle 71 the springs 67 raise the rods 63 and carry the front member 42 into approximately a vertical position.

At approximately the same time that the lower piston rod 26 reaches its uppermost position, as just described, the member 161 of the rod 160 engages the end of the lever 157, thereby depressing the locking rod 148, so that the handle 140 of the valve A is released and moves back into its neutral position by the action of the springs 141 and 143, thereby stopping the further upward movement of the piston 30. When the rods 63 are depressed by the front section 42 of the mold box, the portion 278 of one rod 63 engages the end of the lever 203 and depresses the same; but on account of the slots in the ends of the lever 203 and the rod 202, the rod 202 is not moved. On the other hand, when the rods 63 move upwardly, the portion 278 again engages the end of the lever 203, and the left-hand end of the latter (as shown in Fig. 1) is depressed, thereby correspondingly depressing the rod 202 against the tension of the extension spring 205. This causes the right-hand end of the lever 279 to be moved upwardly, and the arm 200 is rotated in a clockwise direction, thereby opening the valve B. Fluid now passes from the pipe 106 through the valve B into the pipe 122 to the upper end of the cylinder 24, and the piston 25 and its piston rod 26 are thereby caused to move down. This movement continues until the arm 210 engages the member 209 on the end of lever 208. This causes the left-hand end of the lever 208 (indicated in Fig. 1) to be moved up, thereby causing the movement of the arm 200 into the position shown in Fig. 1, and causing the valve B to be closed. At approximately the same time that the arm 210 engages the member 209 of the lever 208, the rod 280 carried by the piston rod 26 engages the member 213 of the lever 212. The actuation of this lever causes the rod 215 to be raised, and opens the valve C, so that fluid flows from the pipe 107 through the valve C into the pipes 119 and 120, (see Fig. 3) thereby causing the piston rods 53 and 58 to move inwardly toward the mold box. This action causes the inward movement of the members 50 and 55ª, and the ridge members 52 and 57 are then moved inwardly, the locking strips 243 and 244 being simultaneously moved into position by the action which has previously been described. Just before the piston rod 26 reaches its lowermost position the arm 262 engages the member 261 carried by the lever 260. As best shown in Figs. 2 and 4, the front end of the lever 260 is thereby depressed, causing the slide 264 to open and the rod 265 will move upwardly. At the same time, the bar 268 is moved forward, so that the belt is shifted from the loose pulley 254 to the tight pulley 253. Rotation of the shaft 252 is thereby caused, and enamel is fed into the mold box in the manner previously described. The cycle of operations is now repeated.

One form of building block which may be produced by my improved mode of machine is illustrated in Figs. 14, 15 and 16, but I do not claim this or any other product of my machine in the present application, as such product forms the subject-matter of a separate application. The block shown in Figs. 14, 15 and 16 is of square shape, and has the cavities 281 formed by the molding plates 32 of the molding plunger 31. The corners of the block are connected by the diagonal walls 282. The front portion 283 of the block is formed in the bottom of the molding box of the machine, and may have a layer of enamel or other similar facing material 284. This front is provided with a downwardly projecting lip 285 and also a laterally projecting lip 286. The front portion 283 also has the upper recess 287 and the lateral recess 288. The top 289 and the side 290 have the ribs 291 and 292, respectively, while the side 293 and the bottom 294 have the grooves 295 and 296, respectively. The ribs 291 and 292 are formed by the grooves 59 and 60 of the mold box, while the grooves 295 and 296 are formed by the ridge members 52 and 57, respectively.

In Figs. 17 and 18 I have shown two additional forms of building blocks which may be made by the use of my molding machine. In order to make such blocks, the sides and bottom of the mold box are removed and another mold box is substituted therefor, being held in position by proper adjustment of the parts which have previously been described. The block shown in Fig. 17 is provided with recessed corners 294 and 295 and the groove 296. The block shown in Fig. 18 is provided with its open end in two levels, namely 297 and 298, and also has the groove 299 and the ridges 300 and 301. The front face 302 is shown in the position in which it is molded in the molding machine.

It will be apparent to those skilled in the art that although I have described my molding machine as being particularly useful in making building blocks of complicated design, my machine is also applicable for molding ceramic material of various shapes, as, for example, jars, sewer pipes, bricks and other similar articles. It will also be clear to those skilled in the art that many detailed changes could be made in the parts which I have described without departing from the spirit or scope of my invention as defined in the appended claims, and without sacrificing any of the advantages thereof.

What I claim is:

1. In a molding machine, the combination with a mold box having an open top, of a plunger adapted to enter the open top of said mold box, fluid-operated means for reciprocating said plunger, a valve for controlling said fluid-operated means, spring means for normally holding said valve in neutral position, locking means for holding said valve when the latter is moved to operative position, and means carried by said plunger for releasing said locking means, and thereby causing said valve to move to neutral position when said plunger reaches a predetermined position.

2. In a molding machine, the combination with a mold box having an open top, of a plunger adapted to enter the open top of said mold box, a cylinder, a piston within said cylinder and connected with said plunger, a valve for selectively controlling the admission of fluid to opposite sides of said piston, whereby said plunger may be reciprocated, spring means for normally holding said valve in neutral position, whereby the entrance of fluid to said cylinder is prevented, a pair of locking members for selectively holding said valve in position to admit fluid to said cylinder on either side of said piston, and a pair of members carried by said plunger for automatically releasing said locking members when said plunger reaches a predetermined position at either end of its stroke.

3. In a molding machine, the combination with a mold box having an open top and a movable bottom, of a plunger adapted to enter the open top of said mold box, means for reciprocating said plunger, means for moving the bottom of said mold box toward said plunger, means carried by said plunger for starting the operation of said mold box bottom moving means when said plunger reaches a predetermined position, automatic means for stopping the movement of said mold box bottom moving means, means carried by said plunger for again starting the operation of said mold box bottom moving means toward said plunger when said plunger reaches a second predetermined position, and auxiliary automatic means for stopping further movement of said mold box bottom moving means when said mold box bottom reaches a predetermined position.

4. In a molding machine, the combination with a mold box having an open top and a movable bottom, of a plunger adapted to enter the open top of said mold box, a cylinder, a piston within said cylinder and connected with said plunger, means for supplying fluid to said cylinder on each side of said piston, a valve for selectively controlling the entrance of fluid to said cylinder on either side of said piston, spring means for normally holding said valve in neutral position, locking means to selectively hold said valve in operative position, a second cylinder, a piston within said second cylinder, means connecting said piston with the movable bottom of said mold box, means for supplying fluid to said second cylinder on opposite sides of said piston, a second valve for controlling the entrance of fluid to either side of the piston in said second cylinder, means carried by said plunger for operating said second valve to admit fluid to said second cylinder to cause said movable bottom of said mold box to move toward said plunger when said plunger reaches a predetermined position, automatic means for moving said second valve to neutral position when said movable bottom has moved a predetermined distance, means carried by said plunger for again moving said second valve to operative position when said plunger has reached a second predetermined position, whereby said movable bottom will be again moved toward said plunger, and automatic means for again moving said second valve to neutral position when said movable bottom has reached a second predetermined position.

ANDREW MALINOVSZKY.

Witnesses:
 HENRY M. HUXLEY,
 L. E. HANNEN.